United States Patent
Zheng et al.

(10) Patent No.: US 9,508,365 B1
(45) Date of Patent: Nov. 29, 2016

(54) MAGNETIC READER HAVING A CRYSTAL DECOUPLING STRUCTURE

(71) Applicant: Western Digital (Fremont), LLC, Fremont, CA (US)

(72) Inventors: Yuankai Zheng, Fremont, CA (US); Qunwen Leng, Palo Alto, CA (US); Xin Jiang, San Jose, CA (US); Tong Zhao, Fremont, CA (US); Zhitao Diao, Fremont, CA (US); Christian Kaiser, San Jose, CA (US); Zhipeng Li, Fremont, CA (US); Jianxin Fang, San Jose, CA (US)

(73) Assignee: WESTERN DIGITAL (FREMONT), LLC., Fremont, CA (US)

( * ) Notice: Subject to any disclaimer, the term of this patent is extended or adjusted under 35 U.S.C. 154(b) by 0 days.

(21) Appl. No.: 14/749,260

(22) Filed: Jun. 24, 2015

(51) Int. Cl.
*G11B 5/39* (2006.01)
*G11B 5/31* (2006.01)

(52) U.S. Cl.
CPC .............. *G11B 5/39* (2013.01); *G11B 5/3903* (2013.01); *G11B 5/3906* (2013.01); *G11B 5/3912* (2013.01); *G11B 5/3116* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |

(Continued)

FOREIGN PATENT DOCUMENTS

| EP | 1752781 | 2/2007 |
|---|---|---|
| KR | 2011134594 | 6/2010 |
| WO | 2005101377 A | 10/2005 |

*Primary Examiner* — Carlos E Garcia
(74) *Attorney, Agent, or Firm* — Convergent Law Group LLP (57) ABSTRACT

A magnetic read apparatus has an air-bearing surface (ABS) and includes a shield, a crystal decoupling structure on the shield and a read sensor on the crystal decoupling structure. The crystal decoupling structure includes at least one of a magnetic high crystalline temperature amorphous alloy layer and a combination of a high crystalline temperature amorphous layer and an amorphous magnetic layer. The high crystalline temperature amorphous layer has a crystalline temperature of at least three hundred degrees Celsius. The amorphous magnetic layer is amorphous as-deposited.

16 Claims, 6 Drawing Sheets

(56) References Cited

U.S. PATENT DOCUMENTS

| | | |
|---|---|---|
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |

(56) References Cited

U.S. PATENT DOCUMENTS

| | | |
|---|---|---|
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,352,543 B2 | 4/2008 | Li et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |

(56) References Cited

U.S. PATENT DOCUMENTS

| | | |
|---|---|---|
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,169,753 B2 * | 5/2012 | Lin .................. B82Y 10/00 360/324.12 |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,451,566 B2 * | 5/2013 | Lin .................. G01R 33/098 360/324.11 |

(56) References Cited

U.S. PATENT DOCUMENTS

| | | | |
|---|---|---|---|
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,537,504 B2 * | 9/2013 | Lin ................... G01R 33/098 360/319 |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,317 B2 * | 3/2014 | Lin .................... 360/324.11 |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2002/0126429 A1 | 9/2002 | Min et al. |
| 2003/0030947 A1 * | 2/2003 | Ooshima ................ 360/324.12 |
| 2003/0167625 A1 | 9/2003 | Li et al. |
| 2003/0179513 A1 | 9/2003 | Pinarbasi |
| 2003/0179514 A1 | 9/2003 | Pinarbasi |
| 2004/0075958 A1 | 4/2004 | Lai et al. |
| 2004/0105191 A1 | 6/2004 | Min et al. |
| 2005/0122635 A1 | 6/2005 | Freitag et al. |
| 2005/0161752 A1 | 7/2005 | Seigler |
| 2005/0201022 A1 | 9/2005 | Horng et al. |
| 2005/0264956 A1 | 12/2005 | Lee et al. |
| 2005/0264957 A1 | 12/2005 | Li et al. |
| 2006/0002042 A1 | 1/2006 | Gill |
| 2006/0002184 A1 | 1/2006 | Hong et al. |
| 2006/0198059 A1 | 9/2006 | Sakai et al. |
| 2007/0019340 A1 | 1/2007 | Gill |
| 2007/0109692 A1 | 5/2007 | Carey et al. |
| 2007/0268633 A1 | 11/2007 | Horng et al. |
| 2008/0137236 A1 | 6/2008 | Lee et al. |
| 2008/0316657 A1 | 12/2008 | Zhang et al. |
| 2009/0087589 A1 | 4/2009 | Guo et al. |
| 2009/0122450 A1 | 5/2009 | Wang et al. |
| 2009/0161268 A1 * | 6/2009 | Lin .................... 360/324.11 |
| 2009/0194833 A1 | 8/2009 | Wang et al. |
| 2009/0251829 A1 | 10/2009 | Zhang et al. |
| 2009/0269617 A1 | 10/2009 | Zhang et al. |
| 2010/0149689 A1 * | 6/2010 | Tsuchiya et al. .......... 360/234.3 |
| 2010/0290157 A1 | 11/2010 | Zhang et al. |
| 2011/0086240 A1 | 4/2011 | Xiang et al. |
| 2011/0122534 A1 | 5/2011 | Freitag et al. |
| 2011/0188157 A1 | 8/2011 | Zhao et al. |
| 2011/0268992 A1 | 11/2011 | Zhang et al. |
| 2011/0273802 A1 | 11/2011 | Zhou et al. |
| 2012/0038012 A1 | 2/2012 | Zhao et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0268847 A1 | 10/2012 | Dimitrov et al. |
| 2012/0298621 A1 | 11/2012 | Gao |
| 2013/0001189 A1 | 1/2013 | Zhao et al. |
| 2013/0216702 A1 | 8/2013 | Kaiser et al. |

(56) References Cited

U.S. PATENT DOCUMENTS

| | | |
|---|---|---|
| 2013/0216863 A1 | 8/2013 | Li et al. |
| 2013/0257421 A1 | 10/2013 | Shang et al. |
| 2014/0111195 A1 | 4/2014 | Kuo et al. |
| 2014/0154529 A1 | 6/2014 | Yang et al. |
| 2014/0175050 A1 | 6/2014 | Zhang et al. |
| 2014/0218821 A1* | 8/2014 | Lu et al. ............ 360/110 |
| 2014/0252517 A1 | 9/2014 | Zhang et al. |
| 2014/0252518 A1 | 9/2014 | Zhang et al. |
| 2014/0334032 A1 | 11/2014 | Nishioka et al. |

* cited by examiner

MAGNETIC READER HAVING A CRYSTAL DECOUPLING STRUCTURE

BACKGROUND

Figure 1:
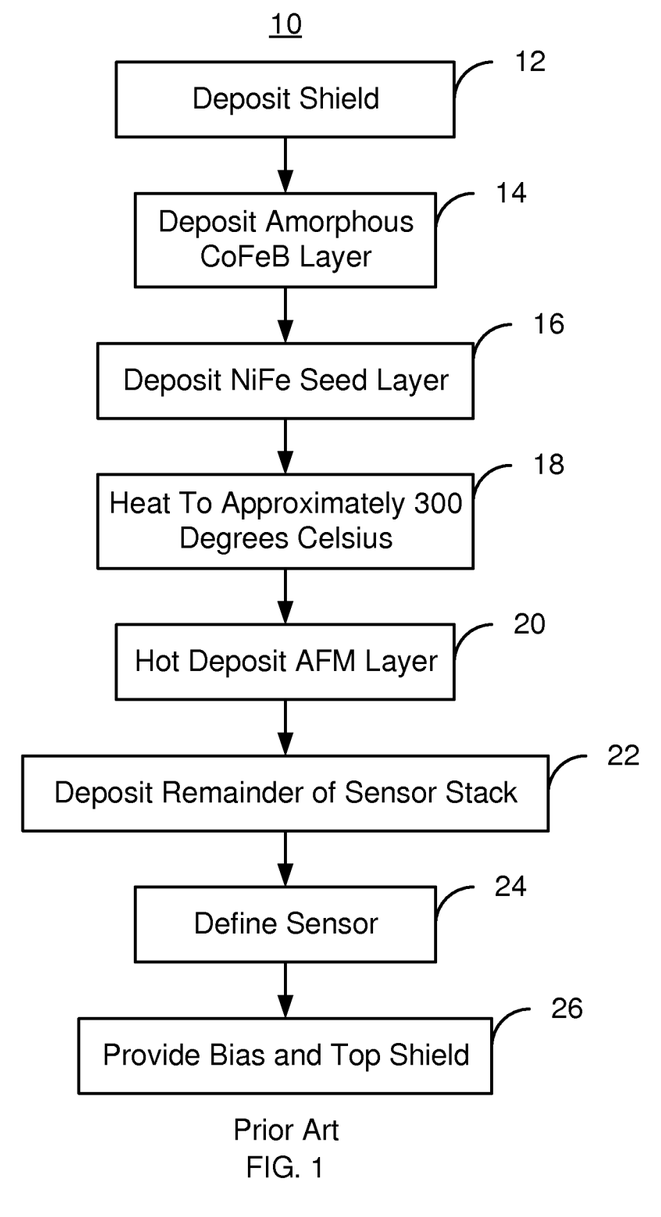
FIG. 1 depicts a flow chart of a method for fabricating a conventional magnetic recording read transducer.

FIG. 1 depicts a flow chart of a conventional method for fabricating a read transducer used in magnetic recording technology applications. The conventional read transducer includes shields, magnetic bias structures, and a sensor. The read sensor is between the shields in the down track direction and between the magnetic bias structures in the cross-track direction. The read sensor is typically a giant magnetoresistive (GMR) sensor or tunneling magnetoresistive (TMR) sensor. The read sensor typically includes an anti-ferromagnetic (AFM) layer, a pinned layer on the AFM layer, a nonmagnetic spacer layer, and a free layer. In addition, seed layer(s) are typically be used. The free layer has a magnetization sensitive to an external magnetic field. Thus, the free layer functions as a sensor layer for the magnetoresistive sensor.

The bottom shield is deposited, via step 12. Step 12 typically includes depositing a soft material, such as NiFe. A layer of CoFeB is deposited, via step 14. CoFeB is typically amorphous as-deposited. A NiFe magnetic seed layer is then deposited, via step 16. The amorphous CoFeB layer thus separates the NiFe in the magnetic seed layer from the NiFe in the shield.

After deposition of the NiFe magnetic seed layer in step 16, the substrate for the reader is heated, via step 18. The substrate is heated to nominally two hundred eighty-five degrees Celsius. Thus, the portion of the read transducer that has been fabricated is heated to approximately two hundred eighty five degrees Celsius. While the substrate is heated, the AFM layer for the sensor is deposited, via step 20. The heating is then typically terminated.

The remainder of the sensor stack is deposited, via step 22. Thus, the tunneling barrier or conductive spacer layer and free layer are provided in step 22. The sensor is defined, via step 24. Step 24 typically includes masking the layers that have been deposited and milling the exposed layers. Thus, the track width in the cross track direction and the stripe height in a direction perpendicular to the ABS may be defined. The magnetic bias structures and top shield are also provided.

Although the method for fabricating conventional transducer functions, there are drawbacks. The exchange coupling between the AFM layer and the pinned layer, as measured by the exchange field (the shift in the hysteresis loop for the pinned layer) may be lower than desired. The quality of the tunneling barrier layer deposited in step 22 may not be as desired. Accordingly, what is needed is a system and method for improving the performance of a magnetic recording read transducer.

DETAILED DESCRIPTION OF THE PREFERRED EMBODIMENTS

Figure 2A:
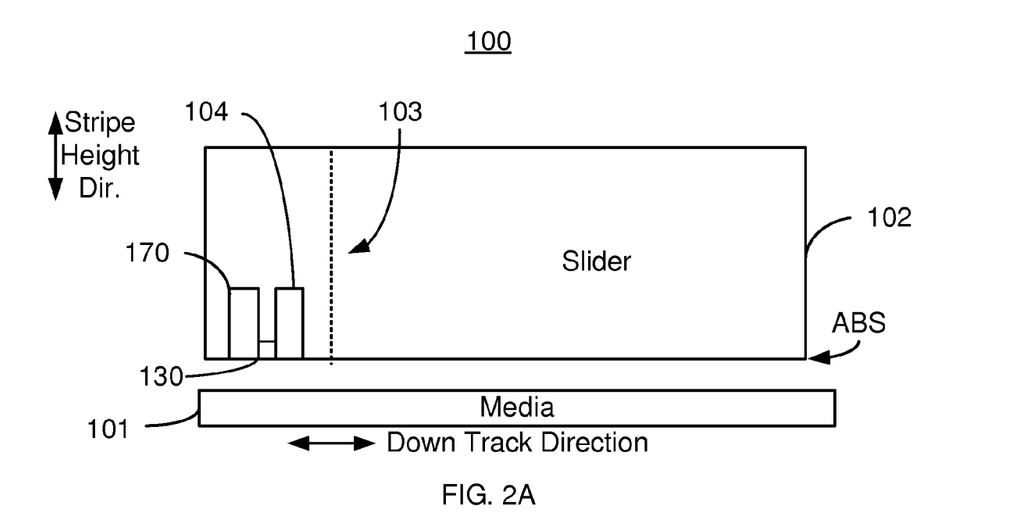
FIGS. 2A-2B depicts side and ABS views of an exemplary embodiment of a portion of a magnetic read apparatus.
Figure 2B:
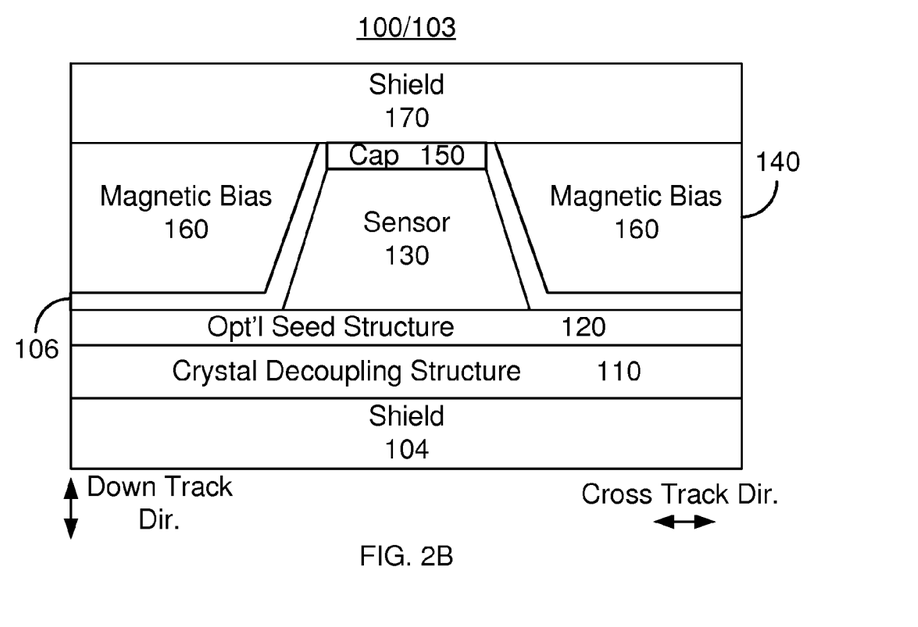

FIGS. 2A-2B depict side and ABS views of an exemplary embodiment of a portion of a magnetic read apparatus 100. For clarity, FIGS. 2A-2B are not to scale. In the embodiment shown, the magnetic read apparatus is a disk drive including a media 101, a slider 102 and a read transducer 103. The read transducer 103 may be part of a read head or may be part of a merged head that also includes a write transducer. Further, only a portion of the components of the read transducer 103 and disk drive 100 are depicted.

The transducer 103 includes soft magnetic shields 104 and 170, insulator 106, read sensor 130, capping layer 150 and side bias structures 160 that may be separated from the read sensor 110 by the insulating layer 106. The transducer 103 also includes a crystal decoupling structure 110 and may include a seed structure 120. The crystal decoupling structure is between the sensor 130 and the shield 104. Further, the crystal decoupling structure 110 is between the seed structure 120 and the shield 104. The shields 104 and 170 are soft magnetic shields. For example, the shields 104 and 170 may be NiFe shields. The seed structure 120 includes a magnetic seed layer. In some embodiments, the seed structure 120 also includes a nonmagnetic spacer layer.

The crystal decoupling structure 110 is used to break the structural coupling between the shield 104 and the read sensor 130 or magnetic seed layer 120. In addition, the crystal decoupling structure 110 allows the magnetic coupling between the shield 104 and the read sensor 130 or magnetic seed layer 120 to be maintained. For example, the shield 104 may have a large grain size while the seed structure 120 and/or sensor 130 may have a smaller grain size. Similarly, the shield 104 may have a particular crystal structure, such as face-centered cubic (FCC), and orientation while the seed structure 120 and/or sensor 130 may have a different crystal structure and/or orientation. However, the shield 104 may still be magnetically (e.g. exchange) coupled with the seed structure 120 and/or sensor 130.

In order to achieve these characteristics, the crystal decoupling structure 110 includes one or more layers that have a high crystalline temperature. The crystalline temperature is the temperature at which the material transitions from amorphous to crystalline. This high crystalline temperature is at least three hundred degrees Celsius. In some embodiments, the high crystalline temperature for the crystal decoupling structure 110 is at least three hundred and fifty degrees Celsius. The high crystalline temperature may be higher, for example four hundred degrees Celsius or more. The layer(s) having the high crystalline temperature are amorphous as-deposited and remain amorphous up to the high crystalline temperature.

The crystal decoupling structure 110 may thus include at least one of a magnetic high crystalline temperature amorphous alloy layer and a combination of a high crystalline temperature amorphous layer and an amorphous magnetic layer. A high crystalline temperature amorphous layer is a layer that has the high crystalline temperature described above. Such a layer may be nonmagnetic. Thus, such a layer is amorphous up to at least the crystalline temperature. This layer may include materials such as Ta, Hf, W and/or Ti. In some embodiments, for example, the high crystalline temperature amorphous layer is a Ta layer. The amorphous magnetic layer is amorphous as-deposited and magnetic. However, the amorphous magnetic layer need not have an intrinsic high crystalline temperature. For example, CoFeB may be used for the amorphous magnetic layer. Because of the presence of the high crystalline temperature layer, however, the amorphous magnetic layer may remain amorphous to higher temperatures than in the absence of the high crystalline temperature layer.

A magnetic high crystalline temperature amorphous alloy is a layer that is magnetic, has the high crystalline temperature described above and is an alloy of particular materials. For example, the high crystalline temperature amorphous alloy may be an alloy of CoFeB and one or more of Ta, Hf, W and Ti. For example, a CoFeBTa layer may be used. Note that CoFeB, CoFeBTa and other like materials do not indicate a particular stoichiometry other than the presence of the materials listed. The crystal decoupling structure is thus amorphous as deposited and has a high crystalline temperature.

Because of the crystal decoupling structure 110, performance of the read sensor 130 and magnetic read apparatus 100 may be improved. For example, portions of the transducer 103 may be brought to higher temperatures during fabrication without crystallizing the structure 110. Thus, the crystal structure of the shield 104 may be decoupled from that of the seed structure 120 and/or read sensor 130. As a result, portions of the read sensor 130 may be grown at an elevated temperature on the seed structure 120 having the desired crystallographic properties. Portions of the read sensor 130 may, therefore, also have the desired crystal structure and magnetic properties. For example, the exchange field between an AFM layer (not shown in FIGS. 2A-2B) and a pinned layer (not shown in FIGS. 2A-2B) may be improved. Thus, the magnetic moment of the pinned layer may be better fixed in a particular direction. The transducer 103 may also be subjected to higher anneal temperatures. For example, annealing for a tunneling barrier layer (not shown in FIGS. 2A-2B) without adversely affecting the crystal structure of the layers 110 and 120. Thus, the magnetoresistance of the sensor 130 may be enhanced. Consequently, use of the crystal decoupling structure 110 may improve performance of the magnetic read apparatus 100.

Figure 3:
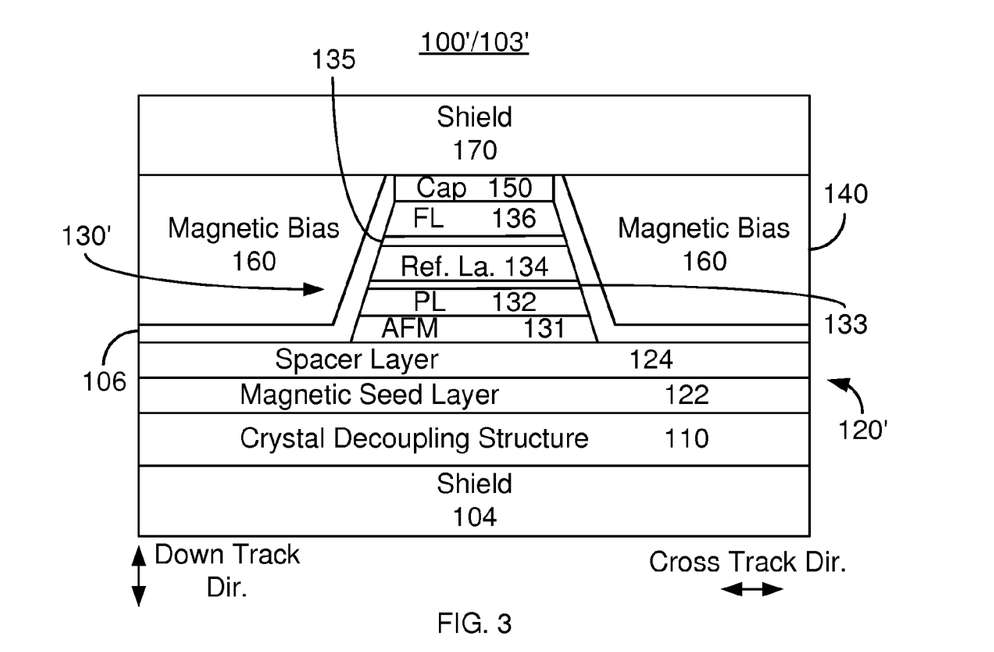
FIG. 3 depicts an ABS view of another exemplary embodiment of a portion of a portion of a magnetic read transducer.

FIG. 3 depicts an ABS view of another exemplary embodiment of a portion of a magnetic read apparatus 100'. For clarity, FIG. 3 is not to scale. The transducer 103'/ magnetic read apparatus 100' are analogous to the read transducer 103 and magnetic read apparatus 100 of FIGS. 2A and 2B. Consequently, similar components have analogous labels. The read transducer 103' thus includes soft magnetic shields 104 and 170, insulator 106, crystal decoupling structure 110, seed structure 120', read sensor 130', capping layer 150 and side bias structures 160 that are analogous to the soft magnetic shields 104 and 170, insulator 106, crystal decoupling structure 110, seed structure 120, read sensor 130, capping layer 150 and side bias structures 160, respectively.

In the transducer 103', the read sensor 130' is explicitly depicted as including a pinning layer 131, a pinned layer 132, a nonmagnetic layer 133, a reference layer 134, a nonmagnetic spacer layer 135 and a free layer 136. The pinned layer 132, nonmagnetic spacer layer 133 and reference layer 134 together form a pinned structure, such as a synthetic antiferromagnet. Thus, the magnetic moments of the layers 132 and 134 may be antiferromagnetically coupled through the layer 133 via an RKKY interaction. In other embodiments, the layers 133 and 134 may be omitted. The pinned layer 132 has its magnetic moment fixed, or pinned, by an exchange interaction with the pinning layer 131. In the embodiment shown, the pinning layer 131 is an AFM layer. The nonmagnetic spacer layer 133 may be conductive or an insulating tunneling barrier layer, such as crystalline MgO. The read sensor 130 is, therefore, a giant magnetoresistive or tunneling magnetoresistive read sensor in the embodiment shown. Thus, the resistance of the read sensor 130 may be used to read data.

The seed structure 120' is shown as explicitly including layers 122 and 124. The magnetic seed layer 122 may be a soft magnetic layer, such as NiFe. The spacer layer 124 is nonmagnetic and conductive. The seed structure 120' has the appropriate crystal structure and orientation for growth of the AFM layer 131.

The magnetic read apparatus 100' and read transducer 103' may share the benefits of the magnetic read apparatus 100 and read transducer 103, respectively. The crystal decoupling structure 110 may improve performance of the read sensor 130'. For example, portions of the transducer 103' may be brought to higher temperatures during fabrication without crystallizing the structure 110. Thus, the crystal structure of the shield 104 may be decoupled from that of the seed structure 120'. For example, the AFM layer 131 may be grown at an elevated temperature up to or near the high crystalline temperature of the crystal decoupling structure 110. For example, the substrate (layers below the AFM layer 131) may be heated to three hundred degrees Celsius (or higher) for and during deposition of the AFM layer 131. Because of its high crystalline temperature, the crystal decoupling structure 110 may retain its amorphous structure during this heating. Thus, the crystal structure of the magnetic seed layer 122 may remain unaffected by the presence of the shield 104. For example, the grain size of the magnetic seed layer 122 may remain small throughout fabrication of the transducer 103'. The AFM layer 131 may then be grown on the magnetic seed structure 120 having the desired crystallographic properties. The AFM layer 131 may, therefore, also have the desired crystal structure and magnetic properties. For example, the exchange field between the AFM layer and a pinned layer may be improved. This is in contrast to growth using the conventional method 10, for which the CoFeB layer may crystallize, allowing the crystal structure of the underlying shield to affect the seed layer and, therefore, the AFM layer. The transducer 103' may also be subjected to higher anneal temperatures for a tunneling barrier layer 135 without adversely affecting the crystal structure of the layers 110 and 120'. Thus, the magnetoresistance of the sensor 130' may be enhanced. Consequently, performance of the magnetic transducer 103' and magnetic read apparatus 100' may be improved.

Figure 4:
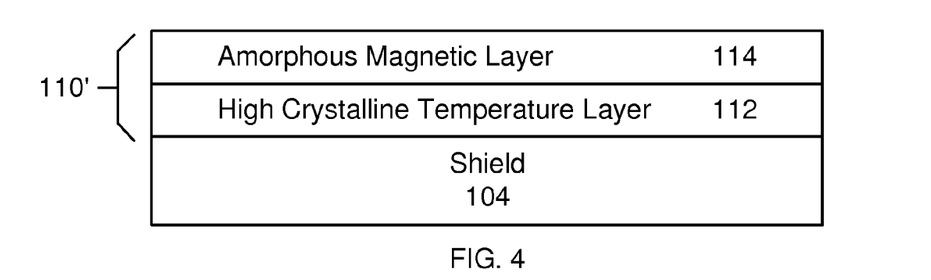
FIG. 4 depicts another exemplary embodiment of a portion of a magnetic read transducer.

FIG. 4 depicts an ABS view of another exemplary embodiment of a portion of a magnetic read transducer including the crystal decoupling structure 110'. For clarity, FIG. 4 is not to scale and only a portion of the transducer is shown. In particular, the crystal decoupling structure 110' and shield 104 that are analogous to the crystalline decoupling structure 110 and shield 104, respectively, are shown.

The crystal decoupling structure 110' includes a high crystalline temperature layer 112 and an amorphous magnetic layer 114. The high crystalline temperature layer 112 has a crystalline temperature of at least three hundred degrees Celsius. As stated previously, the crystalline temperature is the temperature at which the layer transitions from amorphous (as-deposited) to crystalline. The high crystalline temperature layer 112 may have a crystalline temperature of at least three hundred fifty degrees Celsius. In some embodiments, the crystalline temperature of the layer 112 is at least four hundred degrees Celsius. For example, the layer 112 may include one or more of Ta, Hf, W and Ti. In some embodiments, the layer 112 is a Ta layer. A Ta layer 112, for example, has a crystalline temperature of four hundred degrees Celsius. The high crystalline temperature layer 112 is also desired to be thin. In some embodiments, the high crystalline temperature layer 112 has a thickness of not more than three Angstroms. The high crystalline temperature layer 112 may have a thickness of at least one Angstrom and not more than two Angstroms. In some embodiments, therefore, the high crystalline temperature layer 112 is less than one monolayer thick.

The amorphous magnetic layer 114 is magnetic and amorphous as-deposited. At high temperatures, the amorphous magnetic layer 114 may crystallize. For example, the amorphous magnetic layer 114 may be a CoFeB layer. The thickness of such an amorphous magnetic layer may be at least ten Angstroms and not more than thirty Angstroms. If the high crystalline temperature layer 112 is omitted, the CoFeB layer 114 would have a crystalline temperature of not more than three hundred degrees Celsius and may start crystallizing at a temperature of approximately two hundred eighty-five degrees Celsius. In the presence of the high crystalline temperature layer 112, the crystalline temperature of the CoFeB layer 114 may be high. In some embodiments, the crystalline temperature of the amorphous magnetic layer 114 may be approximately the same as the high crystalline temperature layer 112. In the embodiment shown in FIG. 4, the high crystalline temperature layer 112 is between the amorphous magnetic layer 114 and the shield 104. In some embodiments, the high crystalline temperature layer 112 adjoins, or shares an interface with, the shield 104. The high crystalline temperature layer 112 may also adjoin the amorphous magnetic layer 112.

A magnetic read apparatus and read transducer that utilizes the crystal decoupling structure 110' may share the benefits of the magnetic read apparatus 100/100' and read transducer 103/103'. The crystal decoupling structure 110' may remain amorphous to higher temperatures. Thus, the amorphous magnetic layer 114 and the high crystalline temperature layer 112 may remain amorphous to temperatures close or up to the crystalline temperature of the layer 112. Thus, portions of the transducer may be brought to higher temperatures during fabrication without crystallizing the structure 110' or the seed structure 120/120'. Thus, the crystal structure of the shield 104 may be decoupled from that of the layers above the crystal decoupling structure 110'. As a result, the AFM layer and tunneling barrier layer may have improved crystal structure, resulting in increased exchange field and tunneling magnetoresistance. Consequently, a magnetic read apparatus and/or read transducer that utilizes the crystal decoupling structure 110' may have improved performance.

Figure 5:
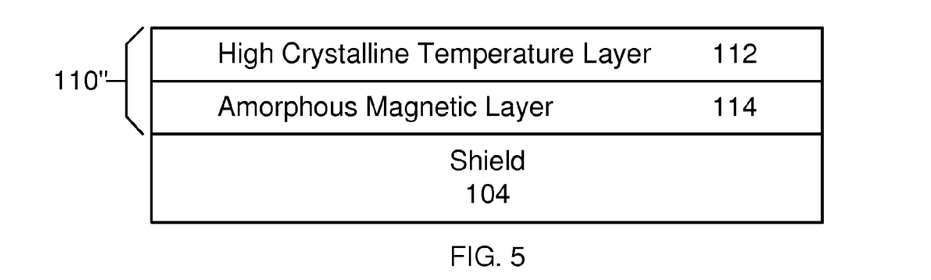
FIG. 5 depicts another exemplary embodiment of a portion of a magnetic read transducer.

FIG. 5 depicts another exemplary embodiment of a portion of a magnetic read transducer including the crystal decoupling structure 110". For clarity, FIG. 5 is not to scale and only a portion of the transducer is shown. In particular, the crystal decoupling structure 110" and shield 104 that are analogous to the crystalline decoupling structure 110/110' and shield 104, respectively, are shown. The crystal decoupling structure 110" includes high crystalline temperature layer 112 and amorphous magnetic 114 analogous to the layers 112 and 114 depicted in FIG. 4. Thus, the thicknesses, materials, and characteristics of the layers 112 and 114 in the crystal decoupling structure 110" are analogous to the thicknesses, materials and characteristics of the layers 112 and 114 in the crystal decoupling structure 110'. However, the embodiment depicted in FIG. 5 locates the amorphous magnetic layer 114 between the high crystalline temperature layer 112 and the shield 104. In some embodiments, the amorphous magnetic layer 114 adjoins the shield 104 and the high crystalline temperature layer 112.

A magnetic read apparatus and read transducer that utilizes the crystal decoupling structure 110" may share the benefits of devices that utilize the crystal decoupling structure 110'. The crystal decoupling structure 110" may remain amorphous to higher temperatures. Thus, the amorphous magnetic layer 114 and the high crystalline temperature layer 112 may remain amorphous to temperatures close or up to the crystalline temperature of the layer 112. Thus, portions of the transducer may be brought to higher temperatures during fabrication without crystallizing the structure 110" or the seed structure 120/120'. Thus, the crystal structure of the shield 104 may be decoupled from that of the layers above the crystal decoupling structure 110". As a result, the AFM layer and tunneling barrier layer may have improved crystal structure, resulting in increased exchange field and tunneling magnetoresistance. Consequently, a magnetic read apparatus and/or read transducer that utilizes the crystal decoupling structure 110" may have improved performance.

Figure 6:
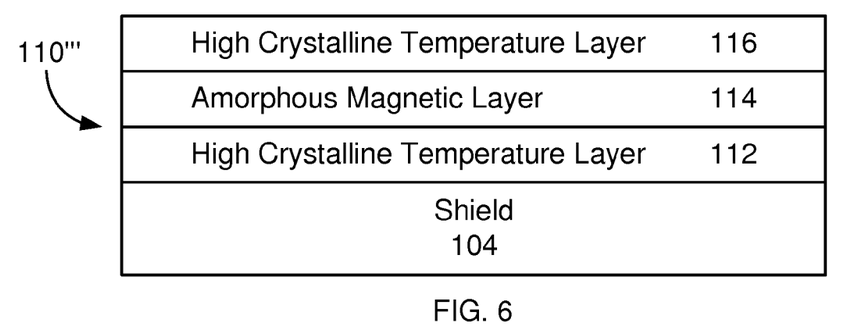
FIG. 6 depicts another exemplary embodiment of a portion of a magnetic read transducer.

FIG. 6 depicts another exemplary embodiment of a portion of a magnetic read transducer including the crystal decoupling structure 110'''. For clarity, FIG. 6 is not to scale and only a portion of the transducer is shown. In particular, the crystal decoupling structure 110''' and shield 104 that are analogous to the crystalline decoupling structure 110/110'/110" and shield 104, respectively, are shown. The crystal decoupling structure 110''' includes high crystalline temperature layer 112 and amorphous magnetic 114 analogous to the layers 112 and 114 depicted in FIGS. 4-5. Thus, the thicknesses, materials, and characteristics of the layers 112 and 114 in the crystal decoupling structure 110''' are analogous to the thicknesses, materials and characteristics of the layers 112 and 114 in the crystal decoupling structure(s) 110'/110".

The crystal decoupling structure 110''' includes an additional high crystalline temperature layer 116. The additional high crystalline temperature layer 116 is analogous to the high crystalline temperature layer 112. Thus, the material(s) used, thickness range(s) and/or other characteristics of the layer 116 may be analogous to those of the layer 112. For example, the layer 112 may include three Angstroms of Ta, while the layer 116 includes one to three Angstroms of Ta and/or Hf.

A magnetic read apparatus and read transducer that utilizes the crystal decoupling structure 110''' may share the benefits of devices that utilize the crystal decoupling structure 110'/110". Thus, portions of the transducer may be brought to higher temperatures during fabrication without crystallizing the structure 110''' or the seed structure 120/

120'. Thus, the crystal structure of the shield 104 may be decoupled from that of the layers above the crystal decoupling structure 110'''. As a result, the AFM layer and tunneling barrier layer may have improved crystal structure, resulting in increased exchange field and tunneling magnetoresistance. Consequently, a magnetic read apparatus and/or read transducer that utilizes the crystal decoupling structure 110''' may have improved performance.

Figure 7:
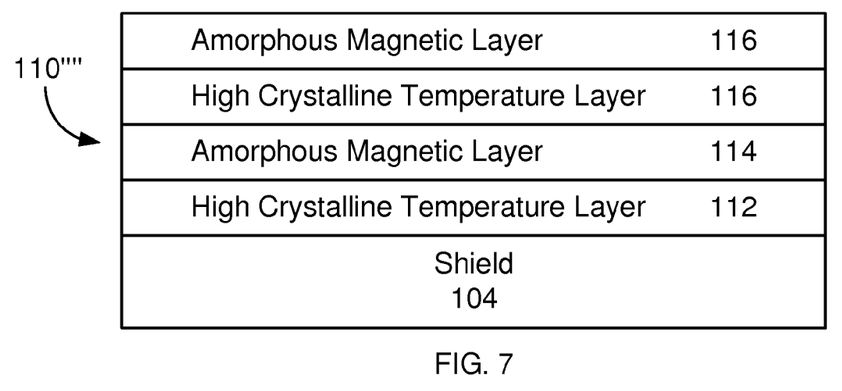
FIG. 7 depicts another exemplary embodiment of a portion of a magnetic read transducer.

FIG. 7 depicts another exemplary embodiment of a portion of a magnetic read transducer including the crystal decoupling structure 110''''. For clarity, FIG. 7 is not to scale and only a portion of the transducer is shown. In particular, the crystal decoupling structure 110'''' and shield 104 that are analogous to the crystalline decoupling structure 110/110'/110''/110''' and shield 104, respectively, are shown. The crystal decoupling structure 110'''' includes high crystalline temperature layer 112, amorphous magnetic 114 and additional high crystalline temperature layer 116 analogous to the layers 112, 114 and 116 depicted in FIGS. 4-6. Thus, the thicknesses, materials, and characteristics of the layers 112, 114 and 116 in the crystal decoupling structure 110'''' are analogous to the thicknesses, materials and characteristics of the layers 112, 114 and 116 in the crystal decoupling structure(s) 110'/110''/110'''.

The crystal decoupling structure 110'''' includes an additional amorphous magnetic layer 118. The additional amorphous magnetic layer 118 is analogous to the amorphous magnetic layer 114. Thus, the material(s) used, thickness range(s) and/or other characteristics of the layer 118 may be analogous to those of the layer 114. For example, the layer 118 may include at least ten and not more than thirty Angstroms of CoFeB. The crystal decoupling structure 110'''' may, in some embodiments, be considered to include multiple repeats of a bilayer. The bilayer includes a high crystalline temperature layer 112 or 116 and an amorphous magnetic layer 114 or 118. FIG. 7 depicts two repeats of the bilayer. In other embodiments, another number of repeats may be used. The top amorphous magnetic layer or bottom high crystalline temperature layer may be omitted in some embodiments.

A magnetic read apparatus and read transducer that utilizes the crystal decoupling structure 110'''' may share the benefits of devices that utilize the crystal decoupling structure 110'/110''/110'''. Thus, portions of the transducer may be brought to higher temperatures during fabrication without crystallizing the structure 110'''' or the seed structure 120/120'. Thus, the crystal structure of the shield 104 may be decoupled from that of the layers above the crystal decoupling structure 110''''. As a result, the AFM layer and tunneling barrier layer may have improved crystal structure, resulting in increased exchange field and tunneling magnetoresistance. Consequently, a magnetic read apparatus and/or read transducer that utilizes the crystal decoupling structure 110'''' may have improved performance.

Figure 8:
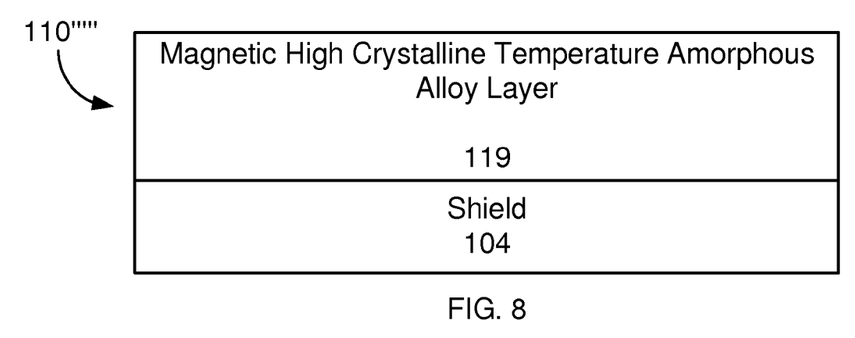
FIG. 8 depicts another exemplary embodiment of a portion of a magnetic read transducer.

FIG. 8 depicts another exemplary embodiment of a portion of a magnetic read transducer including the crystal decoupling structure 110'''''. For clarity, FIG. 8 is not to scale and only a portion of the transducer is shown. In particular, the crystal decoupling structure 110''''' and shield 104 that are analogous to the crystalline decoupling structure 110/110'/110''/110'''/110'''' and shield 104, respectively, are shown. The crystal decoupling structure 110''''' thus has a high crystalline temperature in the ranges described above. The crystal decoupling structure 110''''' also structurally decouples the shield 104 from the layers above the crystal decoupling structure 110'''''. Thus, the structure 110''''' is amorphous. The crystal decoupling structure 110''''' may also allow the shield 104 to be magnetically coupled with the layer(s) above the crystal decoupling structure 110'''''.

The crystal decoupling structure 110''''' includes a magnetic high crystalline temperature amorphous alloy layer 119. This layer 119 is an alloy of at least one high crystalline temperature material and at least one amorphous magnetic material. For example, the amorphous magnetic material may be CoFeB. The high crystalline temperature material may include at least one of Ta, Hf, W and/or Ti. The layer may, therefore, include a CoFeBTa alloy. In some embodiments, the magnetic high crystalline temperature alloy layer 119 has a thickness of at least ten Angstroms and not more than twenty Angstroms. In some embodiments, the thickness is nominally fifteen Angstroms.

A magnetic read apparatus and read transducer that utilizes the crystal decoupling structure 110''''' may share the benefits of devices that utilize the crystal decoupling structure 110'/110''/110'''/110''''. Thus, portions of the transducer may be brought to higher temperatures during fabrication without crystallizing the structure 110''''' or the seed structure 120/120'. Thus, the crystal structure of the shield 104 may be decoupled from that of the layers above the crystal decoupling structure 110'''''. As a result, the AFM layer and tunneling barrier layer may have improved crystal structure, resulting in increased exchange field and tunneling magnetoresistance. Consequently, a magnetic read apparatus and/or read transducer that utilizes the crystal decoupling structure 110''''' may have improved performance.

Various embodiments of crystal decoupling structures 110, 110', 110'', 110''', 110'''' and 110''''' have been described. Various features of the crystal decoupling structures 110, 110', 110'', 110''', 110'''' and 110''''' have been highlighted. One of ordinary skill in the art will recognize that various features of the crystal decoupling structures 110, 110', 110'', 110''', 110'''' and 110''''' may be combined in a manner not inconsistent with the apparatus and method described herein.

Figure 9:
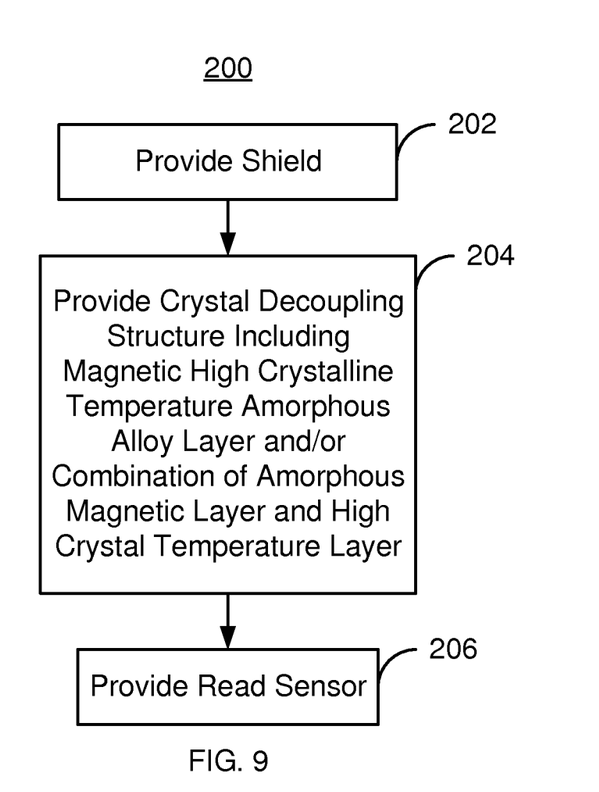
FIG. 9 depicts another exemplary embodiment of a portion of a magnetic read transducer.

FIG. 9 is an exemplary embodiment of a method 200 for providing a read transducer. For simplicity, some steps may be omitted, interleaved, combined, have multiple substeps and/or performed in another order unless otherwise specified. The method 200 is described in the context of providing a magnetic recording apparatus 100 and transducer 103. However, the method 200 may be used in fabricating the transducer 103' and/or another magnetic read apparatus. The method 200 may be used to fabricate multiple devices at substantially the same time. The method 200 is also described in the context of particular layers. A particular layer may include multiple materials and/or multiple sublayers. The method 200 is described in the context of a disk drive. However, the method may be used in other applications employing a magnetoresistive and bias structures. The method 200 also may start after formation of other portions of the magnetic recording transducer.

A shield 104 is provided, via step 202. Step 202 may include depositing a NiFe layer, which may be several hundred nanometers or more. In addition, the footprint of the shield may be defined by providing a mask over the shield layer and removing the exposed portion of the shield layer.

A crystal decoupling structure 110 is provided on the shield 104, via step 204. Step 204 may include forming a magnetic high crystalline temperature amorphous alloy. In other embodiments, step 204 may include depositing one or more high crystalline temperature amorphous layer(s) interleaved with amorphous magnetic layer(s). Thus, the crystal decoupling structure 110, 110', 110'', 110''', 110'''' and/or 110''''' may be fabricated.

A read sensor 130 is provided on the crystal decoupling structure 110, via step 206. Step 206 may include depositing a stack of layers for the read sensor and defining the read sensor in the cross-track and stripe height directions. Step 206 may include heating the portion of the magnetic read apparatus 100 that has already been fabricated to a temperature of at least two hundred and fifty degrees Celsius and not more than the crystalline temperature of the crystal decoupling structure formed in step 204. In some embodiments, the temperature to which the device is heated may be at least three hundred degrees Celsius. In some embodiments, it is ensured that the portion of the transducer 103 that has been fabricated is at a temperature that is less than the crystalline temperature. For example, the substrate may be heated to three hundred or three hundred and twenty-five degrees Celsius during deposition of an AFM layer 131 and/or during annealing of a tunneling barrier layer 133. In such embodiments, the crystalline temperature for the crystal decoupling structure 110 may be at least three hundred fifty degrees Celsius. Fabrication of the apparatus 100 may then be completed. For example, the magnetic bias structures 160 and shield 170 may be formed.

Using the method 200, the transducers 103 and/or 103' and the crystal decoupling structures 110, 110', 110", 110'", 110"" and/or 110""' may be fabricated. Thus, the benefits of one or more of the crystal decoupling structures 110, 110', 110", 110'", 110"" and/or 110""' may be achieved. Consequently, biasing of the free layers 112 and 116 in the read sensor 110 may be improved.

Figure 10:
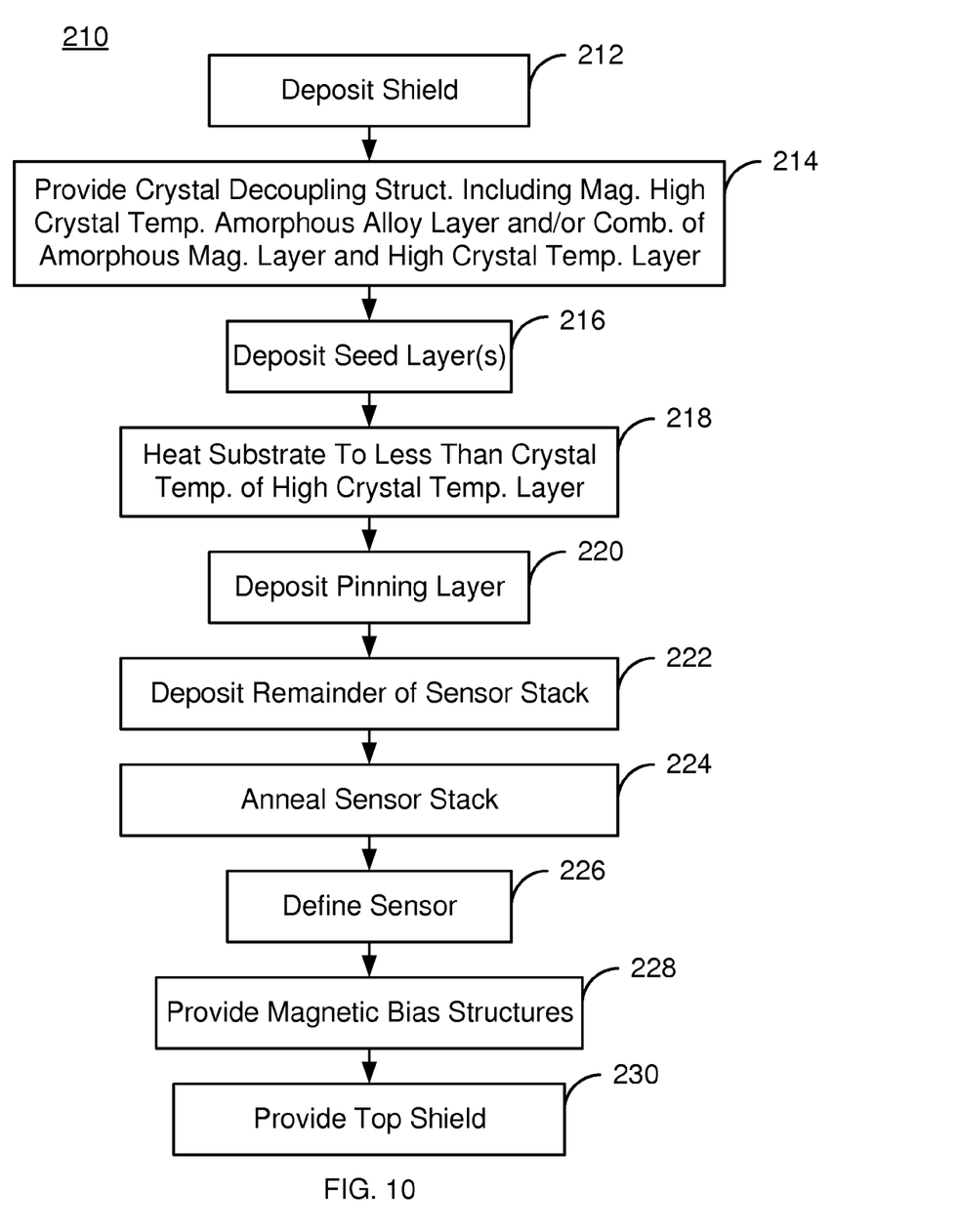
FIG. 10 is flow chart depicting an exemplary embodiment of a method for providing a magnetic recording read transducer.

FIG. 10 is an exemplary embodiment of a method 210 for providing a magnetic read apparatus including a read transducer. For simplicity, some steps may be omitted, interleaved, combined, have multiple substeps and/or performed in another order unless otherwise specified. The method 210 is described in the context of providing a magnetic recording apparatus 100 and transducer 103. However, the method 210 may be used in fabricating the transducer 103' and/or another magnetic read apparatus. The method 210 may be used to fabricate multiple devices at substantially the same time. The method 210 is also described in the context of particular layers. A particular layer may include multiple materials and/or multiple sub-layers. The method 210 is described in the context of a disk drive. However, the method may be used in other applications employing a magnetoresistive and bias structures. The method 210 also may start after formation of other portions of the magnetic recording transducer.

A shield 104 is provided, via step 212. Step 212 may include depositing a thick NiFe layer. In addition, the footprint of the shield may be defined by providing a mask over the shield layer and removing the exposed portion of the shield layer.

A crystal decoupling structure is provided on the shield 104, via step 214. Step 214 may include forming a magnetic high crystalline temperature amorphous alloy. In other embodiments, step 214 may include depositing one or more high crystalline temperature amorphous layer(s) interleaved with amorphous magnetic layer(s). Thus, the crystal decoupling structure 110, 110', 110", 110'", 110"" and/or 110""' may be fabricated.

The seed layer 120/120' is deposited, via step 216. For example, the magnetic seed layer 122 and spacer layer 124 may be fabricated in step 202. Thus, a NiFe seed layer 122 and a nonmagnetic spacer layer 124 may be deposited.

The substrate is heated to a temperature that does not exceed the crystalline temperature of the crystal decoupling layer 110, via step 218. In some embodiments, the temperature to which the substrate is heated is less than crystalline temperature. Thus, at least the shield 104, the crystal decoupling structure 110, 110', 110", 110'" and 110"" and seed structure 120/120' are heated. In some embodiments, the structures 104, 120/120' and 110, 110', 110", 110'", 110"" and/or 110""' are heated to at least three hundred degrees Celsius.

The pinning, or AFM, layer is deposited while the substrate is heated in step 218, via step 220. Thus, the AFM layer 131 of the sensor 130' is deposited. The heating of step 218 may then be terminated. The remainder of the sensor stack is then deposited, via step 222. Step 222 may include depositing the pinned layer 132, optionally depositing the nonmagnetic layer 133, optionally depositing the reference layer 134, depositing the nonmagnetic spacer/tunneling barrier layer 136, depositing the free layer 138 and depositing the capping layer. The sensor stack is typically then annealed, via step 224. For example, the sensor stack may be annealed at a temperature of three hundred to three hundred and twenty-five degrees Celsius. In other embodiments, an anneal temperature of three hundred and fifty degrees Celsius might be used. In other embodiments other anneal temperatures may be used, however, the anneal temperature is desired to be less than the high crystalline temperature of the crystal decoupling structure 110.

The sensor 130 is then defined, via step 226. Step 226 may include providing a mask covering the portion of the sensor stack that forms the read sensor 104. The exposed portion of the stack may then be milled. The magnetic bias structures 160 are provided, via step 228. The top shield 170 is also formed, via step 230.

Thus, the magnetic transducer 103/103' may be fabricated. The method 210 may also fabricates the crystal decoupling structures (s) 110, 110', 110", 110'", 110"" and/or 110""'. Thus, the benefits of one or more of the crystal decoupling structures 110, 110', 110", 110'", 100"" and/or 100""' may be achieved.

We claim:

1. A magnetic read apparatus having an air-bearing surface (ABS) comprising:
    a shield;
    a crystal decoupling structure on the shield, the crystal decoupling structure including at least one of a magnetic high crystalline temperature amorphous alloy layer and a combination of a high crystalline temperature amorphous layer and an amorphous magnetic layer, the high crystalline temperature amorphous layer having a crystalline temperature of at least three hundred and fifty degrees Celsius, the amorphous magnetic layer being amorphous as-deposited, the magnetic high crystalline temperature amorphous alloy layer having a crystalline temperature of at least three hundred and fifty degrees Celsius;
    a magnetic seed layer on the crystal decoupling structure; and
    a read sensor on the crystal decoupling structure and on the magnetic seed layer.

2. The magnetic read apparatus of claim 1 wherein the high crystalline temperature amorphous layer includes at least one of Ta, Hf, W and Ti.

3. The magnetic read apparatus of claim 1 wherein the high crystalline temperature amorphous layer is between the shield and the amorphous magnetic layer.

4. The magnetic read apparatus of claim 1 wherein the amorphous magnetic layer is between the shield and the high crystalline temperature amorphous layer.

5. The magnetic read apparatus of claim 1 wherein the read sensor includes:
a pinning layer;
a pinned layer on the pinning layer;
a nonmagnetic spacer layer; and
a free layer, the nonmagnetic spacer layer being between the free layer and the pinned layer.

6. The magnetic read apparatus of claim 1 wherein the amorphous magnetic layer is a CoFeB layer.

7. A magnetic read apparatus having an air-bearing surface (ABS) comprising:
a shield;
a crystal decoupling structure on the shield, the crystal decoupling structure including at least one of a magnetic high crystalline temperature amorphous alloy layer and a combination of a high crystalline temperature amorphous layer and an amorphous magnetic layer different from the high crystalline temperature amorphous layer, the high crystalline temperature amorphous layer having a crystalline temperature of at least three hundred and fifty degrees Celsius, the amorphous magnetic layer being amorphous as-deposited, the magnetic high crystalline temperature amorphous alloy layer having a crystalline temperature of at least three hundred and fifty degrees Celsius, the high crystalline temperature amorphous layer including at least one of Ta, Hf, W and Ti; and
a read sensor on the crystal decoupling structure,
wherein the high crystalline temperature layer has a thickness of not more than 3 Angstroms.

8. A magnetic read apparatus having an air-bearing surface (ABS) comprising:
a shield;
a crystal decoupling structure on the shield, the crystal decoupling structure including at least one of a magnetic high crystalline temperature amorphous alloy layer and a combination of a high crystalline temperature amorphous layer and an amorphous magnetic layer, the high crystalline temperature amorphous layer having a crystalline temperature of at least three hundred fifty degrees Celsius, the amorphous magnetic layer being amorphous as-deposited, the having a crystalline temperature of at least three hundred fifty degrees Celsius having a crystalline temperature of at least three hundred fifty degrees Celsius; and
a read sensor on the crystal decoupling structure;
wherein the crystal decoupling structure includes the combination and wherein the combination further includes an additional high crystalline temperature amorphous layer, the amorphous magnetic layer being between the high crystalline temperature amorphous layer and the additional high crystalline temperature amorphous layer.

9. The magnetic read apparatus of claim 8 wherein the crystal decoupling structure includes an additional amorphous magnetic layer, the additional high crystalline temperature amorphous layer being between the amorphous magnetic layer and the additional amorphous magnetic layer.

10. A disk drive comprising:
at least one medium; and
at least one slider including at least one magnetic transducer having an air-bearing surface (ABS) configured to reside in proximity to the at least one medium during use, the at least one magnetic transducer including a shield, a crystal decoupling structure, a magnetic seed layer on the crystal decoupling structure and a read sensor, the crystal decoupling structure being on the shield, the crystal decoupling structure including at least one of a magnetic high crystalline temperature amorphous alloy layer and a combination of a high crystalline temperature amorphous layer and an amorphous magnetic layer, the high crystalline temperature amorphous layer having a crystalline temperature of at least three hundred and fifty degrees Celsius, the amorphous magnetic layer being amorphous as-deposited, the having a crystalline temperature of at least three hundred fifty degrees Celsius having a crystalline temperature of at least three hundred fifty degrees Celsius, the crystal decoupling structure being between the shield and the read sensor, the read sensor residing on the magnetic seed layer.

11. A magnetic read apparatus having an air-bearing surface (ABS) comprising:
a shield;
a crystal decoupling structure on the shield, the crystal decoupling structure including at least one of a magnetic high crystalline temperature amorphous alloy layer and a combination of a high crystalline temperature amorphous layer and an amorphous magnetic layer, the high crystalline temperature amorphous layer having a crystalline temperature of at least three hundred and fifty degrees Celsius, the amorphous magnetic layer being amorphous as-deposited, the having a crystalline temperature of at least three hundred fifty degrees Celsius having a crystalline temperature of at least three hundred fifty degrees Celsius, wherein the crystal decoupling structure includes the magnetic high crystalline temperature amorphous alloy layer and the combination of the high crystalline temperature amorphous layer and the amorphous magnetic layer;
a magnetic seed layer on the crystal decoupling structure; and
a read sensor on the crystal decoupling structure and on the magnetic seed layer.

12. A method for providing a magnetic read apparatus having an air-bearing surface (ABS) comprising:
providing a shield;
providing a crystal decoupling structure on the shield, the crystal decoupling structure including at least one of a magnetic high crystalline temperature amorphous alloy layer and a combination of a high crystalline temperature amorphous layer and an amorphous magnetic layer, the high crystalline temperature amorphous layer having a crystalline temperature of at least three hundred and fifty degrees Celsius, the amorphous magnetic layer being amorphous as-deposited, the having a crystalline temperature of at least three hundred fifty degrees Celsius having a crystalline temperature of at least three hundred fifty degrees Celsius;
providing a magnetic seed layer on the crystal decoupling structure; and
providing a read sensor on the crystal decoupling structure, the step of providing the read sensor including heating a portion of the magnetic read apparatus to a temperature of at least two hundred and fifty degrees Celsius and not more than the crystalline temperature, the read sensor residing on the seed layer.

13. The method of claim 12 wherein the high crystalline temperature amorphous layer includes at least one of Ta, Hf, W and Ti.

14. The method of claim 13 wherein the step of providing the crystal decoupling structure further includes:

depositing the high crystalline temperature amorphous layer on the shield; and depositing the amorphous magnetic layer on the high crystalline temperature amorphous layer.

15. The method of claim 13 wherein the step of providing the crystal decoupling structure further includes:

depositing the amorphous magnetic layer on the shield; and depositing the high crystalline temperature amorphous layer on the amorphous magnetic layer.

16. The method of claim 12 wherein the step of providing the read sensor further includes:

providing a pinning layer, the pinning layer being deposited while the portion of the magnetic read apparatus is heated;

providing a pinned layer on the pinning layer;

providing a nonmagnetic spacer layer; and providing a free layer, the nonmagnetic spacer layer being between the free layer and the pinned layer.

* * * * *